(No Model.)
F. REULEAUX.
APPARATUS FOR STARTING, STOPPING AND REVERSING ROTARY MOTION.
No. 272,325. Patented Feb. 13, 1883.
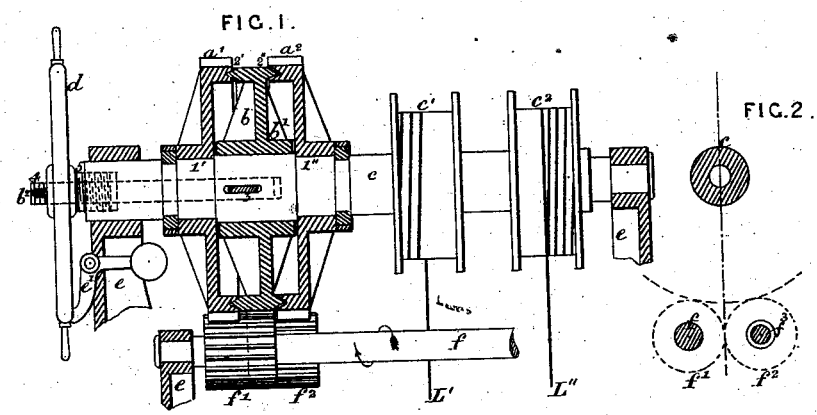
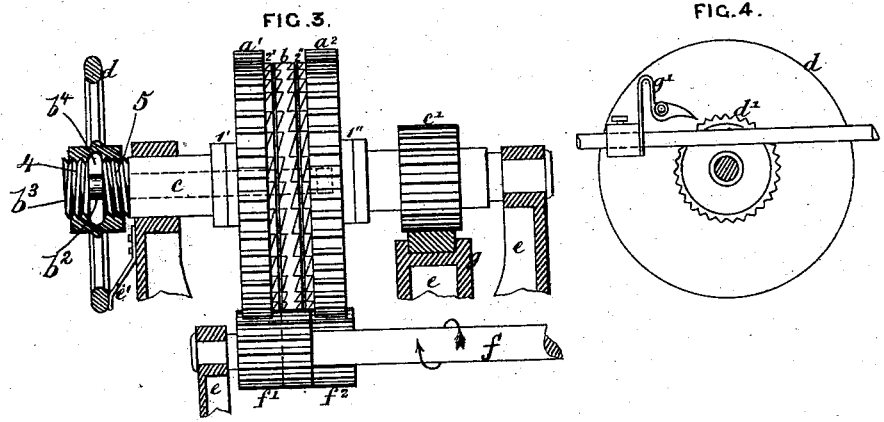
Witnesses.
J. A. Rutherford
George W. Rea
Inventor:
Franz Reuleaux,
By James L. Norris,
Atty.

UNITED STATES PATENT OFFICE.

FRANZ REULEAUX, OF BERLIN, GERMANY.

APPARATUS FOR STARTING, STOPPING, AND REVERSING ROTARY MOTION.

SPECIFICATION forming part of Letters Patent No. 272,325, dated February 13, 1883.

Application filed November 9, 1882. (No model.) Patented in England October 5, 1882, No. 4,746.

*To all whom it may concern:*

Be it known that I, FRANZ REULEAUX, a citizen of Prussia, residing at Berlin, in the Empire of Germany, have invented Improvements in Apparatus for Starting, Stopping, and Reversing Rotary Motion, (for which I have obtained provisional protection in Great Britain, bearing date the 5th October, 1882, No. 4,746,) of which the following is a specification.

This invention relates to improved apparatus whereby the rotary motion of a shaft, whether employed for winding apparatus for raising and lowering objects, or for imparting rotary or rectilinear motion to machinery, can be started, stopped, or reversed at will.

The invention consists mainly in combining with the shaft to be driven two toothed wheels or pulleys, loose thereon and driven continuously in contrary directions, a clutch sliding upon but carried round by the shaft, and screw-gear or equivalent device carried by the shaft for putting the clutch in or out of gear with the one or the other of the wheels or pulleys, the parts being so arranged that by turning the screw-gear in one direction the shaft is made to revolve in one direction, while by turning it in the contrary direction the motion of the shaft is reversed, and by stopping the motion of the screw-gear the motion of the shaft is also stopped.

Figure 1 is a side elevation, partly in section, of an apparatus embodying my invention; Fig. 2, a diagram showing cross-sections of the shaft to be driven, and the continuously-rotating shafts $f$ and $f^3$, carrying the pinions which impart motion to the shaft to be driven; Fig. 3, a side elevation, partly in section, of a modification of my invention; and Fig. 4, a plan view, showing a modified construction of the clutch-operating wheel.

The shaft $c$, to which rotary motion in one direction or the other requires to be given, carries loose thereon two toothed wheels, $a'$ $a^2$, that are made to revolve continuously in opposite directions thereon at 1′ and 1″ between fixed collars, such rotary motion being imparted to them by any suitable mechanism, such as by a pinion, $f'$, on a continuously-revolving shaft, $f$, in gear with the wheel $a'$, and with a second pinion, $f^2$, on a separate shaft, $f^3$, which pinion is in gear with the second wheel, $a^2$. Between the two wheels is a clutch-disk, $b$, whose boss $b'$ slides longitudinally upon the shaft at 3, but is carried round therewith by a feather and groove or other device. This clutch-disk has double conical friction-surfaces at 2′ and 2″, capable of gearing with either one or other of two correspondingly-formed grooves in the wheels $a'$ $a^2$, according as the clutch is slid in one direction or the other. This motion is imparted to the clutch by means of a rod, $b^2$, sliding in a hollow in the shaft $c$, and connected at its inner end to the clutch by means of a cross-head passing through slots in the shaft, while at its outer end it has a screw-thread, 4, screwing through a female screw in a bush, 5, screwing with a screw-thread of slightly less pitch than 4 into a female screw-thread in the end of the shaft $c$, so that by turning the bush 5 by means of the hand-wheel $d$ the rod $b^2$ will be moved in one direction or the other with a speed due to the difference of the pitches of the two screw-threads.

On the shaft $c$ are fixed two winding-drums, $c'$ $c^2$, for simultaneously raising and lowering two loads, L′ L², which may either be of different weight—such as a full bucket or an empty bucket in a mine—or they may be both of the same weight, so as to balance each other. Assuming them to be of unequal weight, then the raising, lowering, and holding them suspended will be effected as follows: The shaft $f$ being driven continuously in the direction indicated by the arrrow, Fig. 1, then if the clutch $b$ be put in gear with the wheel $a'$ the shaft $c$ will be rotated in the direction for winding up the load L′, which we will assume to be the heavier of the two, the screw-gear $b^2$ $d$ being carried round with the shaft. If, now, it be desired at any point to stop the motion of the load and hold it suspended, this may be effected by stopping the rotation of the wheel $d$ of the screw-gear by the application of a brake, $e'$, thereto, carried by the framing $e$. On thus stopping the rotation of the screwed bush 5, while $b$, $b^2$, and $c$ are still being carried round by $a'$, the rod $b^2$ will be screwed inward through the bush 5, and the clutch will consequently be moved out of gear with $a'$. The load L′ will now tend to make the shaft rotate in the contrary direction; but in doing so, the wheel $d$ and bush 5 being still held stationary, the rod $b^2$ will screw itself outward again, bringing the clutch into gear with $a'$ again, thereby causing the shaft to rotate in the direction for raising the load again; but this motion will be again stopped in the manner first described, $d$ being still held stationary, and thus the result will be that the clutch will act as a brake, being held in contact with $a'$ to just a sufficient extent to cause the momentum of friction at $2'$ to balance the momentum of the load $L'$, which will consequently remain stationary, or practically so, the perfect state of rest being dependent upon the perfect lubrication of the frictional surfaces. The degree of frictional contact between the clutch and wheel will be automatically regulated according as the load be greater or smaller, as any increase of the load in tending to turn the shaft backward would advance the clutch toward the wheel and increase the friction, and vice versa.

If it be desired to lower the load $L'$ or to raise the lighter load $L^2$, this may be effected in two ways: first, by turning the wheel $d$ backward after the clutch has been thrown out of gear with $a'$, so as to keep it out of gear, while the shaft is made to revolve backward by the downward pull of the load $L'$, or, in other words, after throwing the clutch out of gear the wheel $d$ and screw-gear may be allowed to revolve backward with the shaft. If, however, it be desired to control the descent, so as to prevent it from taking place too rapidly, the wheel and screw-gear may be turned backward by hand, so that, by retarding its rotation relatively to the shaft, the clutch will be made to bear with more or less frictional contact against the wheel $a'$, and in thus acting as a brake retard the rotation of the shaft; or the same effect may be produced by applying the brake $e'$ to the wheel $d$, so as to retard or stop its rotation. By thus controlling the motion of the screw-gear it is also possible to cause the load to commence and terminate its motion, respectively, with a gradually-increasing and gradually-diminishing speed. Secondly, the descent of the load $L'$ and the ascent of $L^2$, whether this be the lighter or the heavier one, may be effected by turning the hand-wheel $d$ and screw-gear backward until the clutch $b$ is thrown into gear with the wheel $a^2$, which, as before stated, revolves in the contrary direction to $a'$, and consequently will also cause the shaft $c$ to revolve in the contrary direction.

It will be evident that any other mechanism for effecting the raising and lowering of the loads may be employed in place of the winding-drums $c'$ $c^2$—such as pinions or worms on the shaft in gear with racks or worm-wheels that actuate the load—and also that the apparatus may be employed for starting, stopping, and reversing rotary or rectilinear motion in machinery instead of for raising and lowering loads. In this case the stopping would of course have to be effected by throwing the clutch $b$ entirely out of gear with the wheels or pulleys $a'$ $a^2$, and the reversing by throwing it out of gear with the one wheel and into gear with the other wheel.

In place of the frictional-clutch arrangement shown on the drawings, any other known form of frictional clutch or coupling-gear may be employed; or a toothed-clutch arrangement may be used. Fig. 3 shows a modified construction, in which a toothed clutch is substituted for the frictional clutch. In this arrangement, also, the shaft $c$ is shown as employed for imparting a rectilinear to-and-fro motion to a toothed rack, $g$, by means of a pinion, $c'$. The essential parts of this arrangement are the same as in the preceding ones; but in place of the frictional surfaces $2'$ and $2''$ a pair of crown-teeth gearing is employed. The putting in and out of gear requires comparatively a much smaller pressure than the above, and various other friction-clutches; but, on the other hand, a much greater shifting of the clutch $b$ is required. To effect this I form on the exterior of the shaft $c$ a screw-thread, 5, of a quick pitch, and the outer end of the sliding rod $b^2$ is provided with an enlarged head, $b^3$, on the exterior surface of which is formed a screw-thread, 4, also of a quick pitch, but running in a reverse direction to the thread on the shaft $c$. The hub of the wheel $d$ is also formed interiorly with right and left hand screw-threads separated from each other by an annular groove or space, $b^4$, such screw-threads in the hub of the wheel fitting respectively the threads on the shaft and the enlarged head of the sliding-rod. When the clutch $b$ stands centrally between the wheels $a'$ $a^2$, the shaft and the head of the sliding rod stand in the relation to each other represented in Fig. 3—that is to say, there will be a space between the outer end of the shaft and the inner side of the head on the sliding rod, so that the latter can move inward if the clutch is to be engaged with the wheel $a^2$.

Instead of the normal screw-threads, I employ in some cases other curved grooves and projections or cam motions for the shifting of $b$ and the putting in and out of gear of the coupling. If the direction of motion of the rack $g$ is to be changed, the wheel $d$ is stopped and then turned in the contrary direction. If the motion is to be stopped, $d$ is held stationary, and is then left to itself, inasmuch as the brake $e'$ will hold $d$ stationary, and thereby keep the coupling-disk $b$ in the middle disengaged position. In cases where the forces to be transmitted through the shaft $c$ are always small, I employ, in place of the complete coupling-disk $b$, only a sector of the same, of which the teeth can even be reduced to a single one. The toothed coupling may also be constructed otherwise than with crown-teeth.

If the reversal of the apparatus—that is, effecting the change of direction of rotation of $c$—is to take place automatically, I provide the wheel $d$ with a toothed wheel, $d'$, as shown at Fig. 4, which is actuated by adjustable trippers $g'$ in connection with the rack $g$, so as to be turned forward or backward thereby. These trippers $g'$ are made elastic, so that they are bent by the resistance of the wheel $d$, due to the frictional resistance of the screw-gear and clutch, and then jerk the wheel beyond its middle position into the opposite one. Should this arrangement not be sufficient, on account of the resistance of the clutch or from other causes, I employ tripping devices that are cocked by means of the driving-gear before arrival at the end of the stroke, and are only released at that point so as to effect the reversing with sufficient power. With starting, stopping, and reversing apparatus that are reversed by hand, but of which the clutch-gear offers too much resistance for convenient manipulation, the reversal of the wheel $d$ may be effected by an auxiliary starting, stopping, and reversing apparatus of the same construction. The same means may also be adopted when, by means of a small force available in a machine, a starting, stopping, and reversing apparatus requiring comparatively great force is to be actuated. In these cases the wheel $d$, which acts directly on the gearing, is turned forward or backward or stopped by means of the second starting, stopping, and reversing mechanism, for actuating which only a very small force will be required. The brake $e'$ is in this case generally only applied to the auxiliary starting, stopping, and reversing apparatus.

Having thus described the nature of my invention and in what manner the same is to be performed, I claim—

1. The combination of a shaft to be driven, two driving wheels or pulleys loose thereon, mechanism for continuously revolving the wheels or pulleys in reverse directions, a clutch revolving with but capable of sliding on the shaft to engage either wheel or pulley, a rotating screw device carried by the shaft to operate the clutch, and means for holding the screw device in a stationary position to effect the disengagement of the clutch from one of the wheels or pulleys, substantially as described.

2. The combination of a shaft to be driven, two driving wheels or pulleys loose thereon, mechanism for continuously revolving the wheels or pulleys in reverse directions, a clutch revolving with but capable of sliding on the shaft to engage either wheel or pulley, a rotating screw-rod at one end of the shaft, connected with the clutch, a rotating wheel having a threaded bush arranged to operate the screw-rod, and means for holding the wheel in a stationary position to effect the disengagement of the clutch from one of the wheels or pulleys, substantially as described.

3. The combination of a shaft to be driven, two wheels or pulleys loose thereon, mechanism for continuously revolving the wheels or pulleys in reverse directions, a clutch revolving with but capable of sliding on the shaft, a sliding screw-rod in the end of the shaft, connected with the clutch, and a rotating hand-wheel having a screw-threaded bush for operating the screw-rod, substantially as described.

In testimony whereof I have signed my name to this specification, in the presence of two subscribing witnesses, this 17th day of October, A. D. 1882.

FRANZ REULEAUX.

Witnesses:
B. ROI,
H. ZIMMERMAN.